United States Patent
McCauley et al.

(10) Patent No.: US 7,355,521 B2
(45) Date of Patent: Apr. 8, 2008

(54) METHOD AND SYSTEM FOR HEATING DIES

(75) Inventors: Michael McCauley, Dallas, TX (US); Bart Parish, Corinth, TX (US)

(73) Assignee: Balcones Fuel Technology, Inc., Austin, TX (US)

( * ) Notice: Subject to any disclaimer, the term of this patent is extended or adjusted under 35 U.S.C. 154(b) by 439 days.

(21) Appl. No.: 11/240,723

(22) Filed: Sep. 30, 2005

(65) Prior Publication Data

US 2007/0075870 A1    Apr. 5, 2007

(51) Int. Cl.
*G08B 21/00* (2006.01)

(52) U.S. Cl. .................. 340/679; 340/540; 340/541; 340/549; 340/581; 340/588; 219/243; 219/249; 219/494

(58) Field of Classification Search ........... 340/679, 340/540, 541, 549, 581, 588; 219/243, 249, 219/494
See application file for complete search history.

(56) References Cited

U.S. PATENT DOCUMENTS

| | | | |
|---|---|---|---|
| 6,700,659 B1 * | 3/2004 | Chunduri et al. | 356/237.5 |
| 7,196,290 B2 * | 3/2007 | Oliver et al. | 219/243 |
| 2005/0022958 A1 * | 2/2005 | Hirai et al. | 164/113 |

* cited by examiner

*Primary Examiner*—Tai Nguyen
(74) *Attorney, Agent, or Firm*—William D. Wiese

(57) ABSTRACT

A method and system for monitoring the temperature of dies during the processing of thermoplastics. A non-contact infrared remote sensor is configured to remotely monitor each die of a cuber extruder. The face of the cuber dies is divided into four quadrants. A sensor is aimed at the center of mass of each quadrant. The selected sensors are equipped with lenses that have an active sensing area that includes the entire surface of the quadrant, but none of the area of the adjacent quadrants. The signal from each sensor is sent to a temperature controller co-processor directly linked to an industrial control computer. The co-processor executes a modified proportional integral derivative algorithm with the response limits tuned to respond specifically to the thermal inertial factors represented by the cuber die ring and the material being cubed. In addition to the remote sensors, additional infrared or ultrasound sensors are used to insure that the air space between the sensors and the dies is unobstructed.

10 Claims, 5 Drawing Sheets

METHOD AND SYSTEM FOR HEATING DIES

BACKGROUND OF THE INVENTION

1. Field

The system and method of the present invention pertains to the field of recycling waste materials comprising cellulosic fiber and thermoplastic resin; more particularly, an improved method for heating and maintaining the temperature of dies while processing recycled combustible materials into products capable of generating high heat outputs.

2. Background

An increasing number of consumer products are made from thermoplastic resin such as, for example, adhesive liners and medical gowns. Some consumer products, such as, for example, disposable diapers, are primarily made up of thermoplastic resin and cellulosic fiber wherein the thermoplastic material provides a moisture-proof lining on the outside of the diaper and the cellulosic fiber provides the bulky absorbent media on the inside. The cellulosic fiber holds and retains all moisture, while the thermoplastic material ensures that there is no external leakage.

When products such as diapers, adhesive liners, hygiene pads and the like are manufactured, a certain amount of waste is inevitable, resulting in so-called "pre-consumer waste." In addition, many of these products are disposable in nature and, as a result, are used just once and thrown away resulting in "post-consumer waste." The ultimate disposal of pre-consumer and post-consumer waste typically involves transporting it to the local landfill. Environmentalists abhor this type of disposal as being wasteful both in the manufacture and disposal of these products. For example, the manufacture of disposable diapers requires forest products to obtain the necessary cellulose and the disposal of the diapers utilizes valuable landfill space. Moreover, the U.S. Environmental Protection Agency (EPA) has placed increase restrictions on landfill requirements. For example, the EPA has recently enforced the requirement of double lining landfills for disposal of paper mill sludge. Consequently, there has been a dramatic increase in cost for establishing new landfills that comply with EPA requirements for paper mill by-products.

In addition to the increased reluctance to use forest products and increased restrictions in landfill requirements, there has also be an increase in demand for new sources of energy. Combustible products made from cellulosic fibers and thermoplastic resins offer a higher BTU output and provide a clean-burning alternative to conventional fuels. However, use of available cellulosic waste as a fuel source has achieved only limited acceptance to date. One reason for this is the relatively low heating value of cellulose as compared to, for example, coal. For example, cellulosic fibers alone can have a heating value of less than 7,000 BTU's per pound, while coal generally has heating value in excess of 9,000 BTU's per pound. Another problem is that many consumer products have substantial tear-resistant properties because the polymers are highly cross-linked or otherwise heavily processed, making these products exceptionally difficult to shred or extrude.

Methods and systems for processing materials consisting substantially of thermoplastic resin and cellulosic fiber into combustible materials are well known in the art. Typically, these processes typically consist of placing the materials in slow-speed, high-torque shredders where the material is shredded to a consistent size and then moved by a conveyor line to a "cuber," or extrusion machine, where fuel cubes are extruded under pressure. However, there are a number of problems that arise with this process.

For example, in recent years, many companies have made significant advances in improving the tear-resistant properties of thermoplastic materials. These highly tear-resistant materials, by their very nature, are exceptionally difficult to process using conventional means. For example, if these materials are processed through normal shredder devices, the shredder will quickly become bound-up and, in many cases, cease operating. Moreover, because the materials are combustible by nature, they have a propensity for catching fire if exposed to high heat or friction, such as during processing. As a result, if the operator is successful in maintaining the operation of the shredder, the friction involved in processing these materials creates an extreme fire hazard. There is a need, therefore, for an improved method for processing recycled combustible materials into products capable of generating high heat outputs.

Currently, cuber die temperatures are monitored with metal-to-metal contact thermocouples, each configured to monitor one cuber die quadrant. The disadvantages of this technique are twofold. First, if a heater element in a first die in which a thermocouple is mounted, or a die adjacent to the first die, fails, the reading from the thermocouple no longer reflects the average temperature of the quadrant. Those skilled in the art will recognize this to be a common occurrence and one that is not addressed by any prior heating system. Second, once the above situation occurs, the quadrant in question begins to go into thermal runaway. Because the controller is being fed a low temperature signal, it increases the on cycle times of the remaining heaters in an attempt to compensate. This results in excessive heater temperature, which induces additional heater element failures. In prior systems, no automatic detection systems existed so, therefore, if this situation is not detected by the operator, the quadrant in question eventually goes into a chain reaction style runaway situation, which often results in damage to electronics as well as spontaneous ignition of the cubes upon discharge from the dies.

Accordingly, it is on object of the present invention to provide an improved method for monitoring and maintaining die temperatures during the processing of thermoplastic resins and cellulosic materials.

Another object of the present invention is to mitigate system runaway due to erroneous readings obtained by a contact style sensors.

Another object of the present invention is prevent system underloading due to erroneous readings obtained by a contact style sensors.

Another object of the present invention is to enhance the overall cube quality and uniformity through consistent, predictable die temperatures.

Yet another object of the present invention is to reduce the risk of a cuber fire due to temperatures of the dies exceeding preset limits.

BRIEF SUMMARY OF THE INVENTION

This present invention is for an improved system and method for monitoring and maintaining die temperatures during the processing of products made of cellulosic fiber and thermoplastic resin. A non-contact infrared remote sensor is configured to remotely monitor each die of the cuber. The face of the cuber dies, a ring of about eight feet in diameter, is divided into four quadrants. A sensor is aimed at the center of mass of each quadrant. The selected sensors are equipped with lenses that have an active sensing area that includes the entire surface of the quadrant, but none of the area of the adjacent quadrants. The signal from each sensor is sent to a temperature controller co-processor directly linked to an industrial control computer. The co-processor executes a modified proportional integral derivative algorithm with the response limits tuned to respond specifically to the thermal inertial factors represented by the cuber die ring and the material being cubed. In addition to the remote sensors, additional infrared or ultrasound sensors are used to insure that the air space between the sensors and the dies is unobstructed.

BRIEF DESCRIPTION OF THE DRAWINGS

A better understanding of the system and method of the present invention may be had by reference to the drawing figure, wherein.

DETAILED DESCRIPTION

The present invention is an improved system and method for monitoring and maintaining die temperatures during the processing of products made of cellulosic fiber and thermoplastic resin. It should be appreciated that the present invention is equally applicable to the processing of products other than cellulosic fibers and thermoplastic resin. It should also be appreciated that heating mechanisms other than dies benefit from the teachings contained herein. Accordingly, where the words die or dies are used, the words heating device or heating devices may be substituted.

Figure 1:
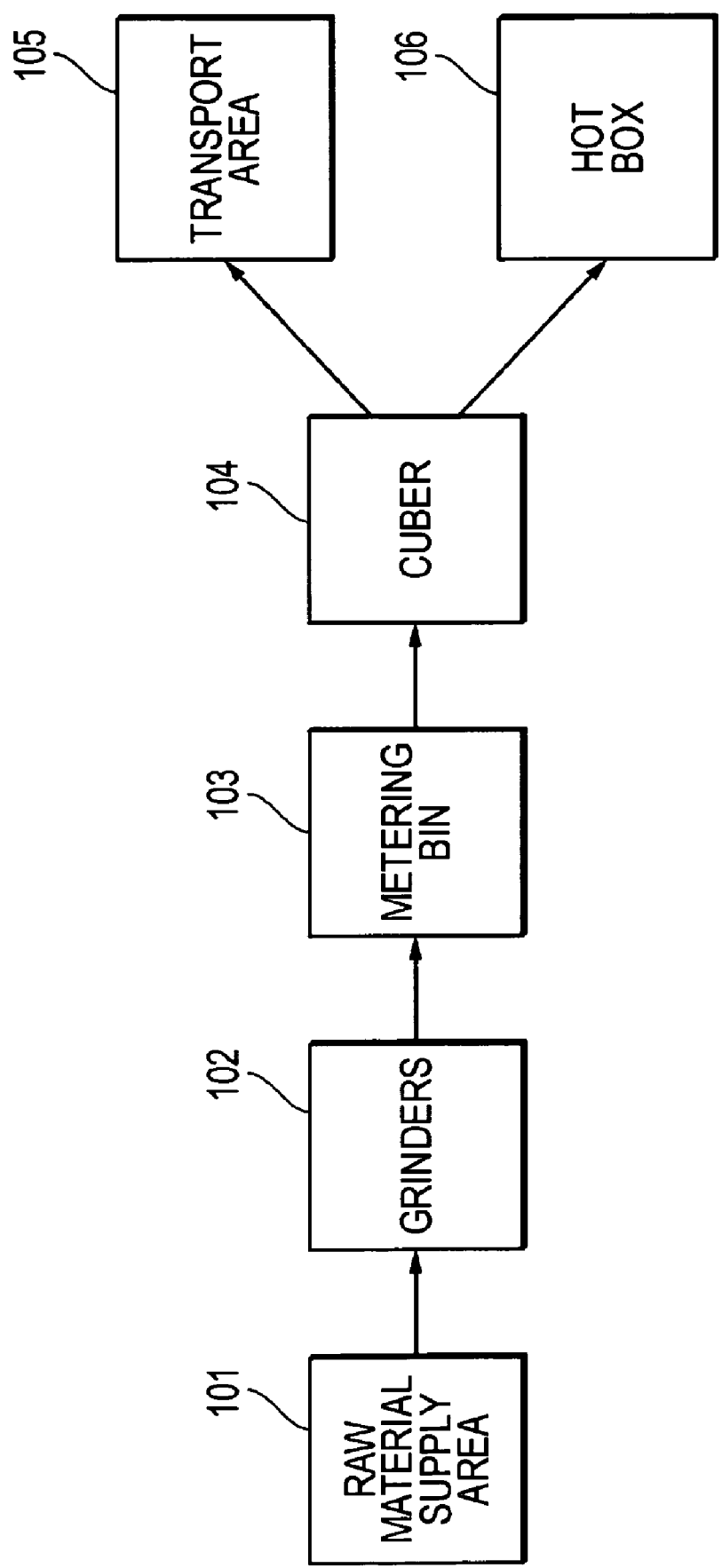
FIG. 1 shows a flow diagram of a process using the remote monitoring sensors of the present invention.

Referring now to the various figures of the drawing wherein like reference characters refer to like parts throughout the several views. FIG. 1 shows a flow diagram of a process in which remote monitoring of heating dies may be used. At the raw material supply area 101, feedstock is brought into the facility. The feedstock can consist, for example, of non-saleable waste materials from paper mills, such as disposable diapers, hygiene pads, hospital gowns and the like. The feedstock may be made up of thermoplastic material and cellulosic material. The thermoplastic material can be practically any available thermoplastic such as, but not limited to, polystyrene, polyethylene, polypropylene, acrylonitrile-butadienestyrene, acetal copolymer, acetal homopolymer, acrylic, polybutylene, and combinations thereof. However, thermoplastic materials most useful in the present invention are illustrated generally by the polyolefins such as polyethylene, polypropylene, polybutylene, and the like. Other thermoplastic resins are suitable so long as they have softening properties similar to the polyolefins, whereby they serve as lubricants for processing the feedstock, and as bonding agents to assist in bonding the layers together to make the finished combustible products.

For fast burning and ease of ignition of the fuel pellets, polypropylene and polyethylene are the preferred synthetic thermoplastic materials. In one embodiment of the invention, feedstock is approximately 60% non-chlorinated thermoplastic materials and 40% cellulosic fibers.

One skilled in the art will recognize that other materials may be processed with the feedstock such as, for example, to improve the combustibility of the finished product. Oxidizing agents such as sodium perchlorate and ammonium nitrate to facilitate combustion can be included in the feedstock. Materials such as comminuted tires, thermosetting resins and/or petroleum distillation residue can be added to improve the heating value of the finished product. Also, binding agents in addition to thermoplastic materials can be used. Exemplary of such binding agents are paraffin slack wax, carnuba wax, and lignosulfonates, such as ammonium lignosulfonate, sodium lignosulfonate, calcium lignosulfonate, and magnesium lignosulfonate.

Feedstock from the raw material supply area 101 is next fed into the grinders 102. As used herein, the term "grinder" refers to any device used for the purpose of reducing the size of the feedstock, including by grinding, shredding, pulverizing, chopping, granulating, crushing or the like. The purpose of the grinder 102 is to reduce the feedstock to a size suitable for passing through the cuber 104.

The ground feedstock is next passed through a cuber 104 consisting of an auger or augers, a press wheel and series of dies for the purpose of extruding the material into the desired shape. As the name implies, the cuber 104 can form the ground feedstock into cubes, however there are a number of other shapes that the cuber 104 may form that may be as, or more, desirable as combustible products. As used herein, the term "cube" refers to a discrete product of any size or shape that contains both cellulosic material and thermoplastic material. The cube need not be square or even symmetrical. While it may be useful to form the products in the shape of cubes, they can be any suitable symmetrical configuration such as the shape of a tube or a sphere. In one embodiment of the invention, elongated "cubes" are formed that are approximately 1 inch by 2 inches. The cuber 104 is operated at a pressure of between about 7,000 and 10,000 psi. The desired temperature of the dies, discussed further below, is about between 300 and 400 degrees Fahrenheit, with the temperature depending on the specific blend of the material and the moisture content in the feedstock. This combination of high pressure and temperature serves to seal the edges of the cubes. The processing of the ground feedstock at high heat creates a substantially water-impervious coating, or sheath on the outside of the combustible products, thereby both preventing uptake of moisture by the combustible products and resisting weathering in storage. Furthermore, the hydrophobic nature of the plastic prevents water uptake such that combustible products can be left out in the rain and still be readily processed in a furnace with no deterioration in heat output.

Because the variety of the composition and the moisture content of the material entering the cuber, it is quite difficult to maintain the cuber dies at the desired temperature. When contact style sensors are used, system runaway or system underloading may occur due to erroneous readings inherent to that style of sensor. If temperatures are not maintained, cube quality and uniformity deteriorates and, more significantly, the risk of fire escalates.

Figure 2:
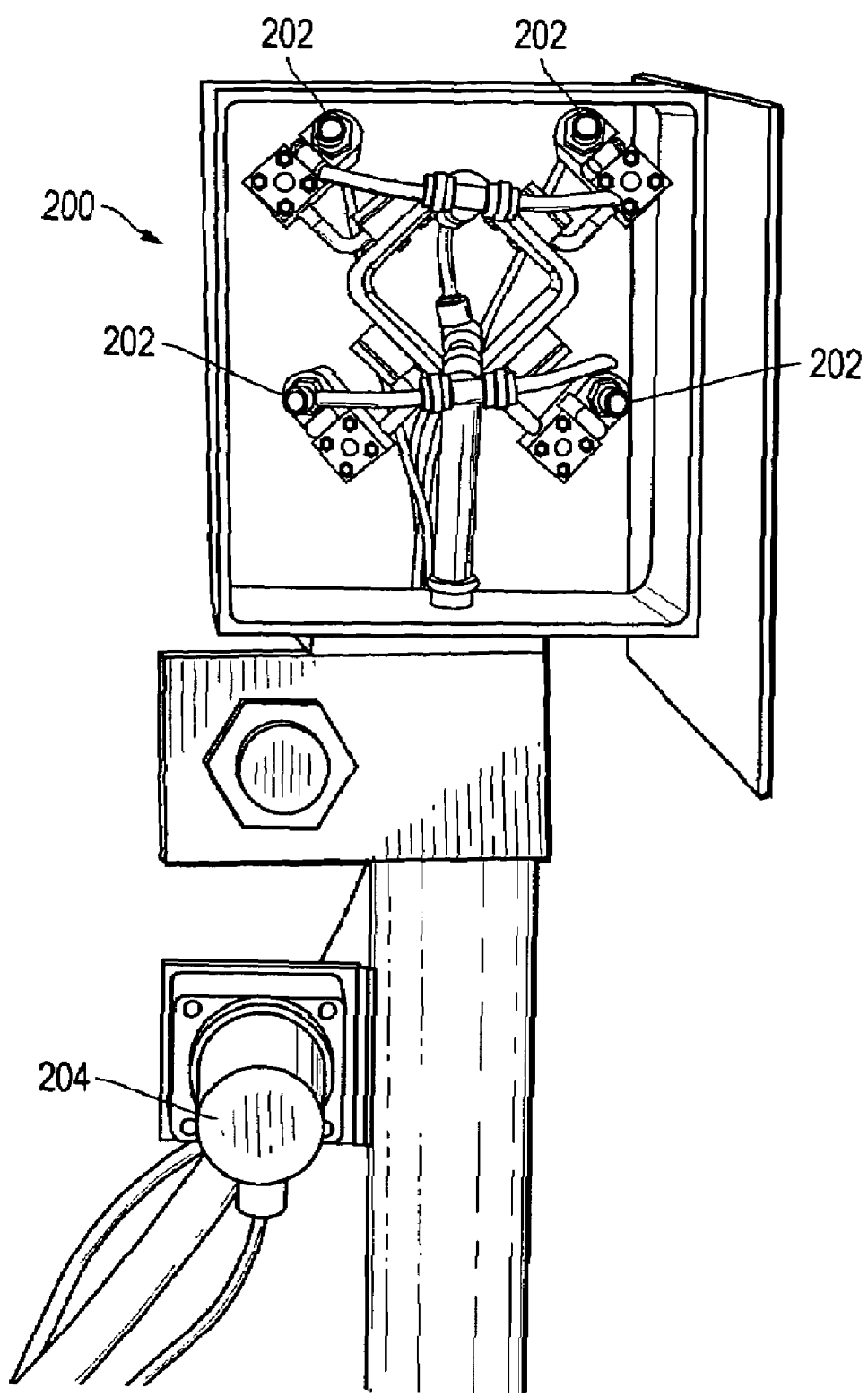
FIG. 2 shows a front view of the infrared sensor assembly of the present invention including the infrared sensor array and the non-interference sensor.

In order to overcome the problems associated with contact-style sensors, the dies of the present invention are monitored remotely. FIG. 2 shows one embodiment of a non-contact infrared remote temperature sensor 200 of the present invention configured to remotely monitor the temperature of each die of the cuber. By utilizing a long range infrared sensor 202 that senses one portion of the die, but no more than that portion, it is possible to obtain the precise temperature data required. In one embodiment, the face of the dies on the cuber, a ring of about eight feet in diameter, is divided into four quadrants. Each sensor 202 is aimed at the center of mass of each quadrant. The selected sensors 202 may be equipped with lenses that have an active sensing area that includes the entire surface of the quadrant, but none of the area of the adjacent quadrants. The signal from each sensor 202 is sent to a temperature controller co-processor directly linked to an industrial control computer which can be located either in close proximity to, or remotely from, the sensors 202. The co-processor executes a modified proportional integral derivative algorithm with the response limits tuned to respond specifically to the thermal inertial factors represented by the cuber die ring and the feedstock (material being cubed). It should be appreciated that, although the configuration shown in the attached drawings contemplates dividing the die face into four quadrants, the die face could just as easily be configured as a single face, two faces, three faces or five or more faces and, in each case, a separate sensor 202 would be employed to monitor the applicable portion of the die face.

Figure 3:
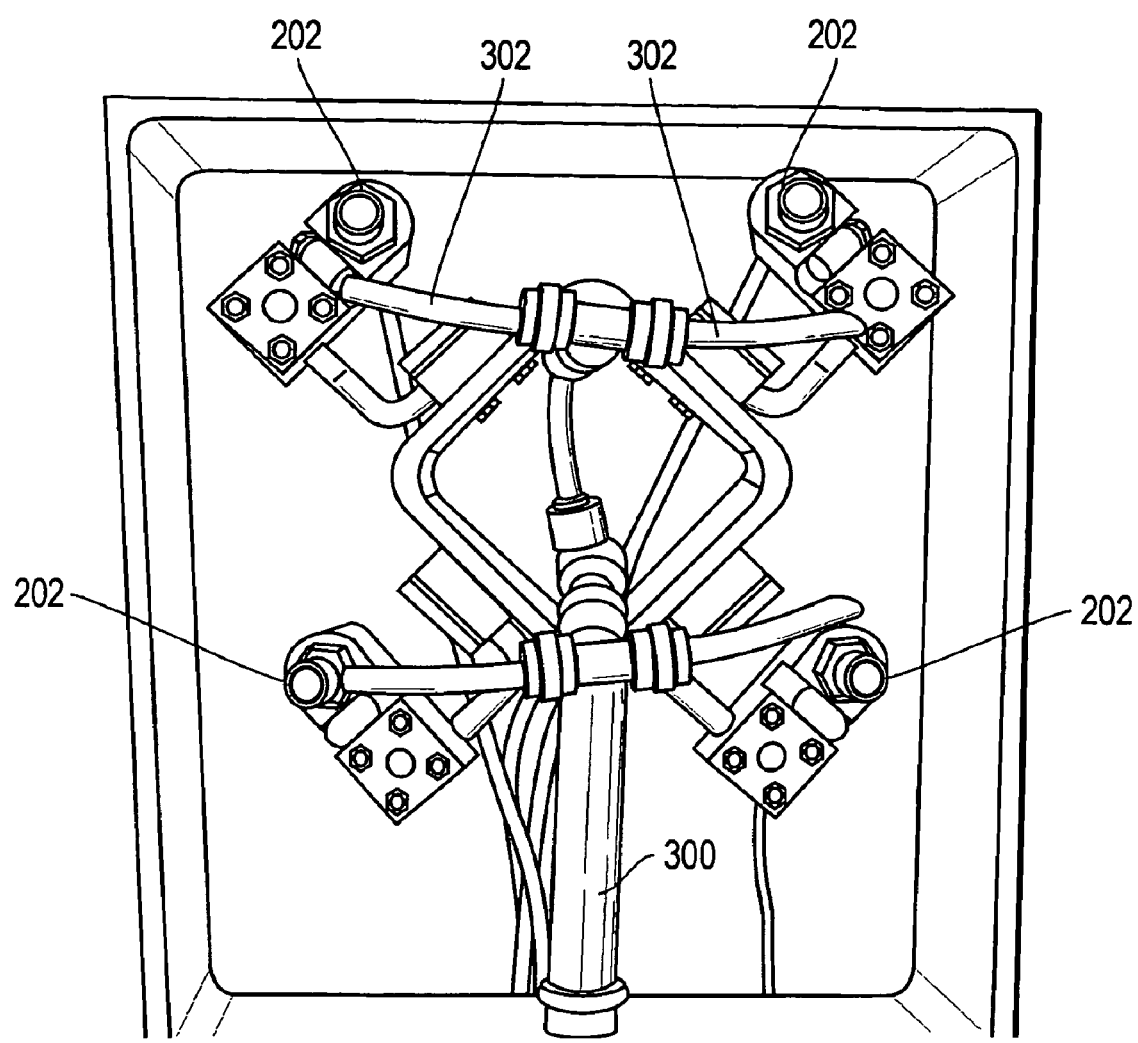
FIG. 3 shows a front view of the infrared sensor assembly of the present invention.
Figure 4:
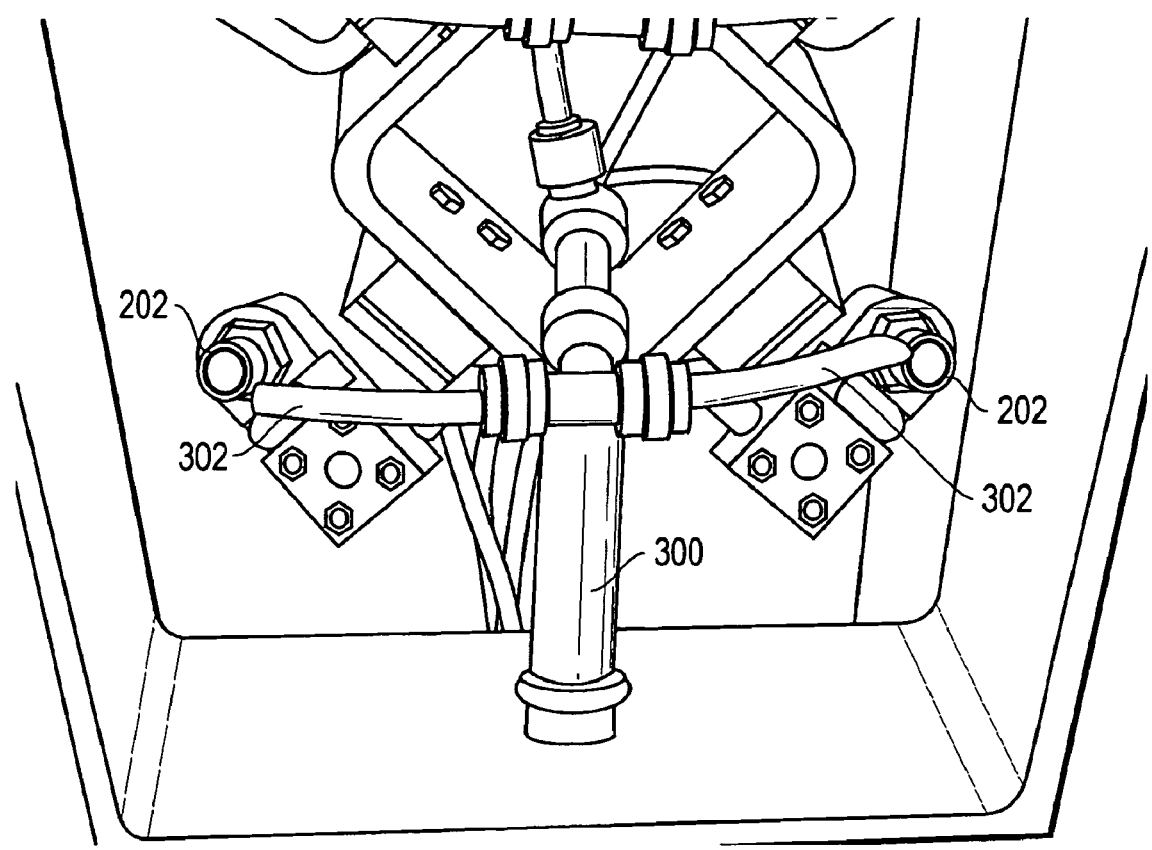
FIG. 4 shows a front view of the infrared sensor assembly of the present invention.

FIGS. 3 and 4 show a support 300 holding the sensors 202. In one embodiment of the invention, each of the sensors 202 is fitted with four nozzles 302 discharging highly filtered and dried compressed air toward the each sensor 202, the purpose of which is to keep the sensor lenses clean. It is necessary to maintain the lenses of the sensors 202 in a clear and clean condition. Otherwise, the sensors 202 may collect dust or debris causing them to not function properly whereupon the advantages of remote monitoring could be lost.

Figure 5:
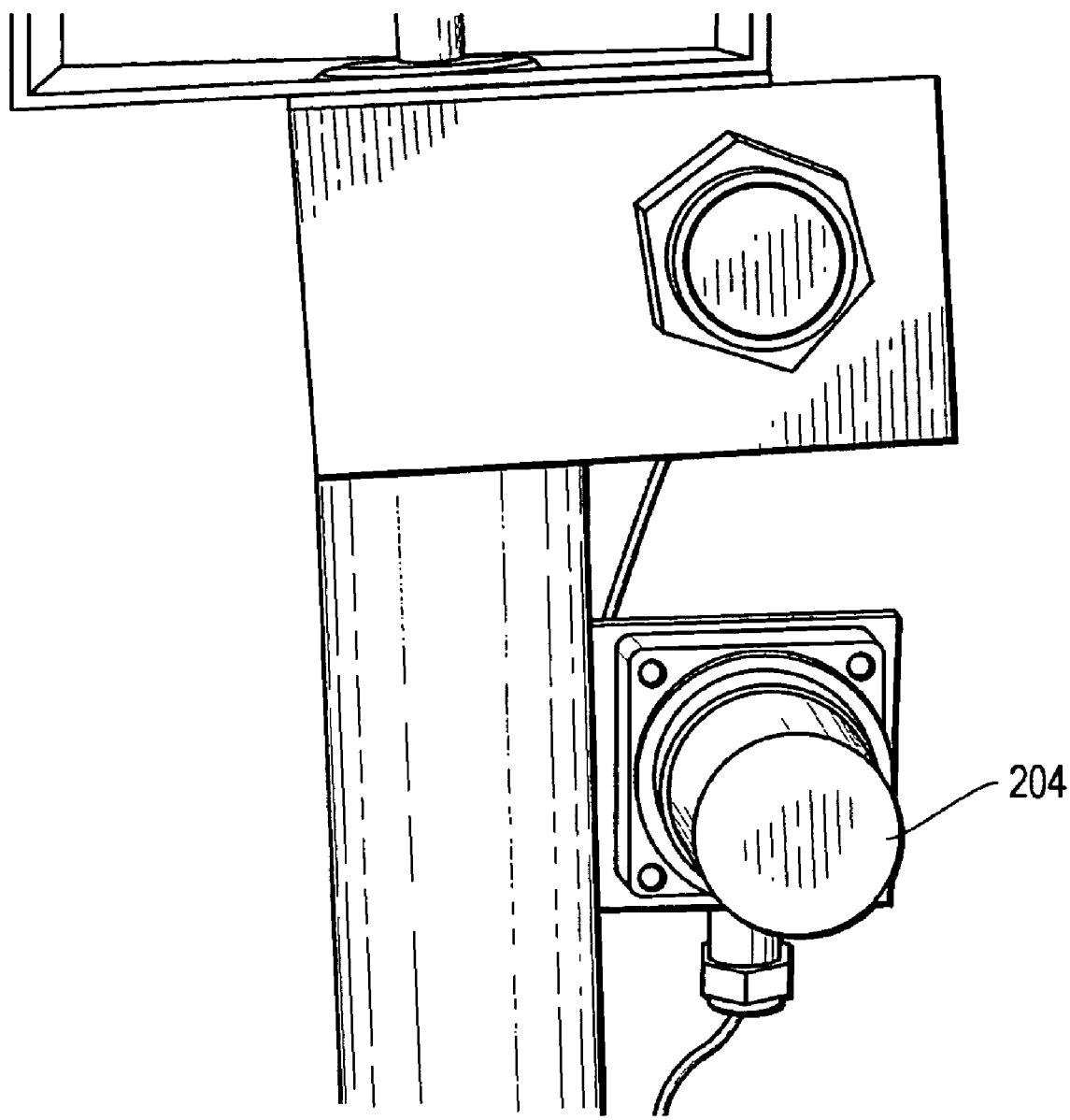
FIG. 5 shows the non-interference sensor of the present invention.

Referring now back to FIG. 2, in addition to the remote sensors 202, additional infrared or ultrasonic non-interference sensors 204 are used to insure that the air space between the sensors 202 and the dies is unobstructed. FIG. 5 shows a detailed view of one embodiment of the non-interference sensor 204 of the present invention. The non-interference sensor 204 ensures that the line of sight between the sensor array and the cuber is kept clear of obstructions. The sensor 204 can detect, for example, when a person walks in front of the cuber and, therefore, interferes with the line of sight between the remote temperature sensors 202 and the cuber dies. When the area between the temperature sensors 202 and the dies is obstructed, the non-interference sensors 204 trigger an alarm, warning plant personal than an obstruction exists. In another embodiment of the invention, if the obstruction is not removed after some pre-determined time, the cubers are shut down. If the obstructions were not detected, either because of the lack of non-interference sensors or the failure of the non-interference sensors, the heating system could go into thermal runaway.

Once the information is transmitted from the temperature sensors 202 to the industrial control computer, it is managed through a graphical user interface (GUI). It is heretofore unknown in the aret to use a GUI to control elements of a heating system wherein the die temperatures are remotely monitored. The GUI screen includes a real time on-screen data display with "hot spot" mouse click control. There are a number of advantages to utilizing a GUI in connection with the remote monitoring of die temperatures. For example, because the extrusion process is prone to catch fire if not carefully controlled, a GUI allows all heat control variables and fault alarming to be brought together in one control center in single simple format. As a result, the operator has a substantially better opportunity to control temperatures before a problem occurs. Also by way of example, because the system of the present invention contemplates remotely monitoring the dies, reprogramming variables and monitoring temperature zones can be accomplished much more efficiently than with the hard-wired systems previously known in the art. For example, changing a plant over from one type of feedstock, such as pre- or post-consumer waste products, to another type of feedstock, such as carpet remnants, could be accomplished with a significantly lower expenditure of time and material than with a hard-wired system.

Another benefit of remotely monitoring the die temperatures and providing the information in a real time basis to the PLC is that, unlike a conventional industry standard heat controller, the sensor response, output limits and timing of the present system are completely reconfigurable by the user. For example, at initial startup, a standardized production run can be made with the temperature control module temporarily operating in manual mode using previously calculated initial proportional integral derivative (PID) constants. These constants can be selected based on the thermal properties of the material to be cubed and the characteristics of the dies. By pre-selecting these values to be used as the initial values by the PID calculations, a much more stable, less erratic process was realized.

As another example of the benefits of dynamically reconfiguring the parameters of the present system, it is possible to maintain greater control by altering the on-time and of-time limits that the PID loop is permitted to use. When material of different moisture contents is run though a compression process, changes in the relationship of the thermal characteristics of the material relative to the dies significantly alters the process dynamics. Because it is undesirable to expend the production time necessary to reset the PID values for such changes, the present system permits the changing of the on-time and off-time limits that the PID loop is permitted to utilize, as well as its "external" gain (P) and integrating (I) values. By doing so, it is possible to alter the thermal response of the system without the need for retuning. By simply loading a new set of values in the system, the desired system response (i.e. well compacted cubes without excessive risk of ignition) was achieved.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of possible dies and die monitoring equipment, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A method for monitoring the temperature of dies comprising:

Positioning a remote temperature sensor so that said remote temperature sensor can monitor the temperature of a heating die in a manufacturing process;

Providing information from said remote temperature sensor to a computer, said computer being communicatively coupled to said heating die and adjusting the temperature of said heating die in response to information received by said computer from said remote temperature sensor; and a non-interference sensor positioned to sense whether an area between said remote temperature sensor and said heating die is unobstructed, wherein said non-interference sensor is communicatively coupled to said computer and, when said area between said remote temperature sensor and said heating dies is obstructed, an alarm is activated.

2. The method of claim 1 further including a nozzle for discharging air onto said remote temperature sensor to keep said remote temperature sensor free of dust and debris.

3. The method of claim 1 wherein said remote temperature sensor is an infrared sensor.

4. The method of claim 1 wherein said heating die is divided into more than one portions and each portion of said heating die is monitored by a separate remote temperature sensor.

5. The method of claim 1 wherein the non-interference sensor is an infrared or ultrasonic sensor.

6. A system for monitoring the temperature of dies comprising:

a remote temperature sensor positioned so that said remote temperature sensor can monitor the temperature of a heating die in a manufacturing process;

a computer, wherein said computer is communicatively coupled to said heating die and said remote temperature sensor, said computer acquiring information from said remote temperature sensor and adjusting the temperature of said heating die in response to said information; and a non-interference sensor positioned to sense whether an area between said remote temperature sensor and said heating die is unobstructed, wherein said non-interference sensor is communicatively coupled to said computer and, when said area between said remote temperature sensor and said heating dies is obstructed, an alarm is activated.

7. The system of claim 6 further including a nozzle for discharging air onto said remote temperature sensor to keep said remote temperature sensor free of dust and debris.

8. The system of claim 6 wherein said remote temperature sensor is an infrared sensor.

9. The system of claim 6 wherein said heating die is divided into more than one portions and each portion of said heating die is monitored by a separate remote temperature sensor.

10. The system of claim 6 wherein the non-interference sensor is an infrared or ultrasonic sensor.

* * * * *